(No Model.)

A. L. & L. J. BARTHELEMY.
FILTER SCREEN.

No. 558,341. Patented Apr. 14, 1896.

Witnesses.

Inventors
Aristide L. Barthelemy.
Louis J. Barthelemy.
By Walter H. Cook
Atty.

UNITED STATES PATENT OFFICE.

ARISTIDE L. BARTHELEMY AND LOUIS J. BARTHELEMY, OF NEW ORLEANS, LOUISIANA.

FILTER-SCREEN.

SPECIFICATION forming part of Letters Patent No. 558,341, dated April 14, 1896.

Application filed July 12, 1895. Serial No. 555,792. (No model.)

*To all whom it may concern:*

Be it known that we, ARISTIDE L. BARTHELEMY and LOUIS J. BARTHELEMY, citizens of the United States, residing at New Orleans, in the parish of Orleans and State of Louisiana, have invented certain new and useful Improvements in Filter-Screens; and we do hereby declare that the following is a full, clear, and exact description of the same, reference being had to the annexed drawings, making a part of this specification, and to the figures of reference marked thereon.

This invention relates to filter-screens for use with filter-presses, strainers, or other appliances employed in the filtration of juices, syrups, and other liquids.

It is the object of our invention to provide a double filter-screen of such construction that clogging and obstruction will be obviated and the filtered liquids be allowed to pass freely, and so that the screen will not require to be frequently taken out of service for the purpose of cleaning. Screens ordinarily in use, composed of a single layer of crossed wires covered with a filter-cloth, often become clogged by reason of the closeness of the wires and narrowness of the intervening spaces, and such filter-screens require to be taken out and cleaned after a few hours' use.

Our invention consists in a double filter-screen comprising two parallel frames riveted closely together, intervening rods extended vertically between said frames parallel therewith, and two layers or series of diamond-meshed or twisted wires placed on opposite sides of said rods and secured therewith between the said frames, the construction being such that the vertically-arranged rods will hold apart the diagonally-arranged series of screen-wires and afford such thickness to the double screen and such openness of mesh that the filter-cloths used on opposite sides of the screen will not be pressed or drawn together and so that clogging and obstruction of the screen will be effectually obviated.

The invention is illustrated in the annexed drawings, in which—

Figure 1:
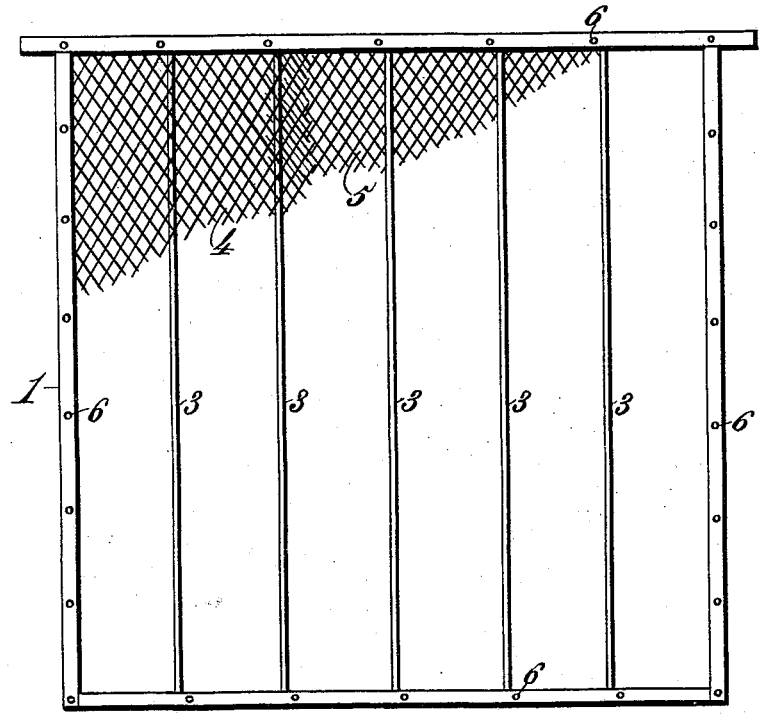
Figure 2:
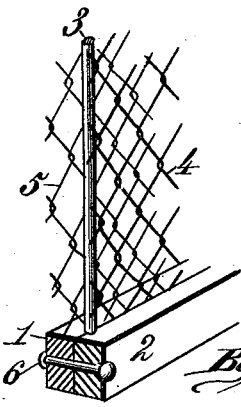

Figure 1 is a plan of our improved double filter-screen, showing a portion of the screen-body broken out. Fig. 2 is an enlarged partial vertical section of the same.

In the construction of our improved double filter-screen we employ two frames 1 and 2, placed parallel to each other and securely riveted together. The screen-body is composed of vertically-arranged rods 3 and two opposite layers or series of screen-wires 4 and 5, one series of said wires being placed on each side of the intervening rods 3 and the wires in each layer being crossed diagonally to form a diamond mesh, as shown. The ends of the vertically-extended rods 3 and diagonally-arranged wires 4 and 5 are clamped between the two frames 1 and 2, which may be securely fastened together by means of rivets 6, as shown, or in any other suitable and convenient manner. It is preferable to employ galvanized metal for the rods 3 and wires 4 and 5, and the frames 1 and 2 may be composed of the same material or of any suitable wood. The frame or frames may be made rectangular or in any form required. If desired, the inner edges of the frame may be suitably notched to receive the ends of the rods 3, so that when the frames are clamped together the rods and the wires constituting the double screen-body will be firmly held in place.

The rods 3 serve to impart stiffness to the screen and prevent the opposite series of wires 4 and 5 from being pressed together. By the vertical arrangement of these rods 3 the vertical passage of liquids is facilitated and clogging of the screen prevented. This construction of filter-screen affords a suitable degree of thickness for holding apart the filter-cloths that are usually placed on opposite sides of the screen, or the screen may be used to distend the filter-bag that is sometimes employed. By reason of the largeness and openness of mesh afforded by this construction of filter-screen the device is not liable to obstruction and clogging with filtered matters, the liquids will be permitted to pass freely and with great ease, and the efficiency and economy of the filter-screen is greatly enhanced. As there is no liability of clogging, the screen will not require frequent cleaning and may remain in service for long periods without any impairment of efficiency.

What we claim as our invention is—

1. A double filter-screen composed of two layers or series of wires crossing each other diagonally in each layer, the vertically-extended rods intermediate the said layers of screen-wires, and a frame in which said screen wires and rods are clamped, substantially as described.

2. A double filter-screen composed of two layers or series of diagonally-meshed wires, a frame in which the ends of said wires are secured, and the vertically-extended rods intermediate the two layers of screen-wires and having their ends secured in said frame, substantially as described.

3. A double filter-screen composed of two parallel frames, two layers or series of screen-wires, the vertically-extended rods intermediate said layers of screen-wires, and rivets securing the said frames together to clamp the said wires and rods, substantially as described.

In testimony whereof we have hereunto subscribed our names in the presence of two witnesses.

ARISTIDE L. BARTHELEMY.
LOUIS J. BARTHELEMY.

Witnesses:
R. E. L. C. RIES,
A. RICHARD.